Figure 3:
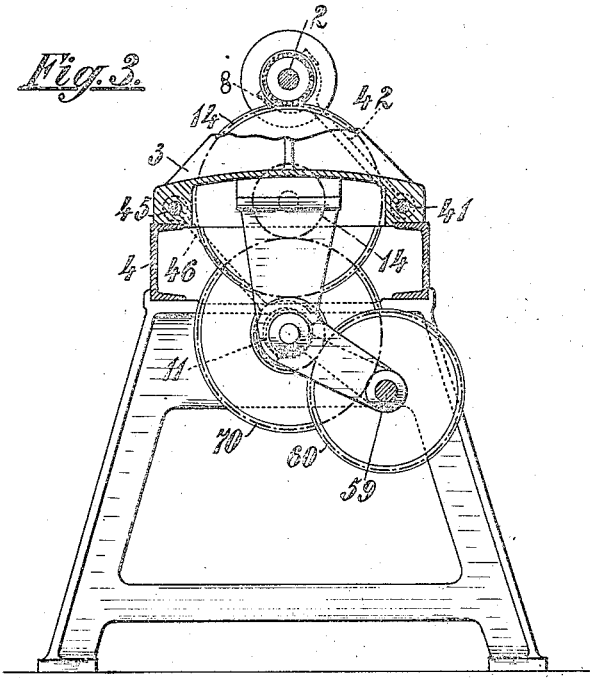

O. SCHMID.
FLAT WIRE NETTING MACHINE.
APPLICATION FILED MAY 24, 1910.
1,005,480.
Patented Oct. 10, 1911.
7 SHEETS—SHEET 1.
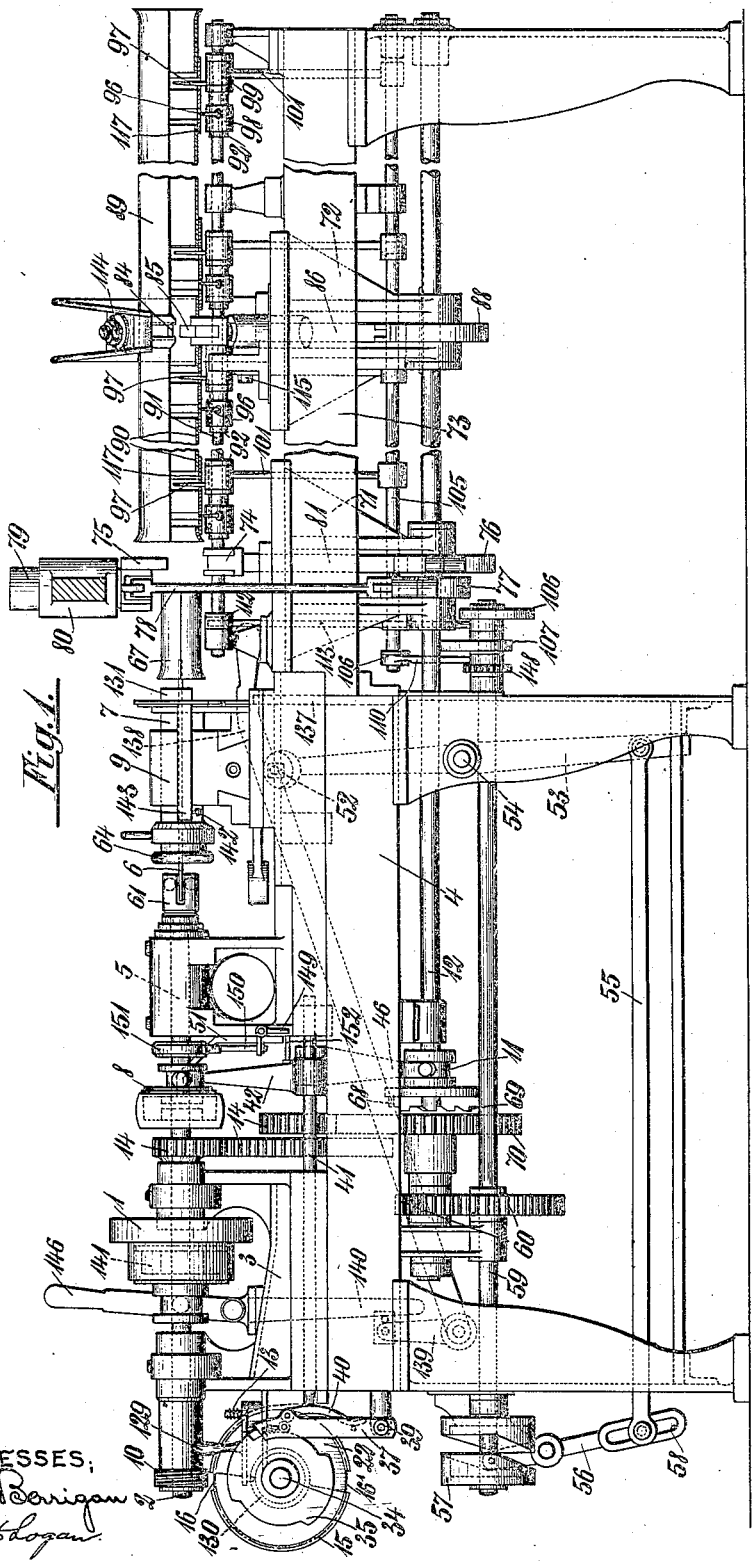
WITNESSES:
INVENTOR,
OTTO SCHMID,
by
Attorney O. SCHMID.
FLAT WIRE NETTING MACHINE.
APPLICATION FILED MAY 24, 1910.
1,005,480.
Patented Oct. 10, 1911.
7 SHEETS—SHEET 2.
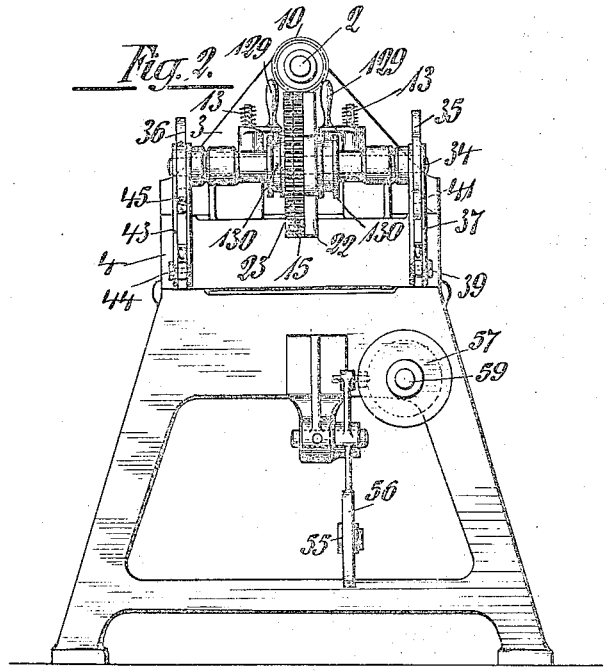
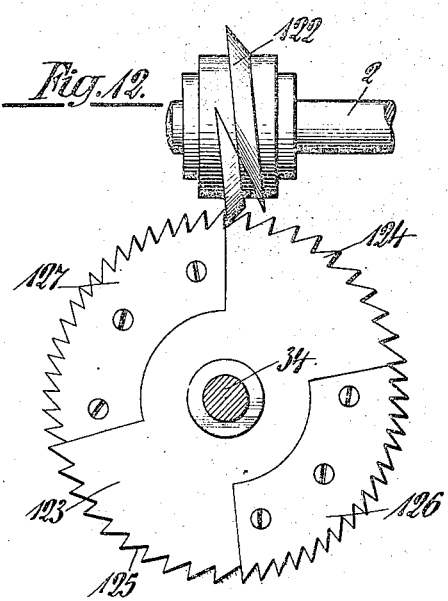
WITNESSES:
INVENTOR,
OTTO SCHMID,
by
Attorney.

O. SCHMID.
FLAT WIRE NETTING MACHINE.
APPLICATION FILED MAY 24, 1910.

1,005,480.

Patented Oct. 10, 1911.
7 SHEETS—SHEET 3.

WITNESSES:
W. H. Berrigan.
F. H. Logan.

INVENTOR,
OTTO SCHMID,
by Van Deusen
Attorney.

O. SCHMID.
FLAT WIRE NETTING MACHINE.
APPLICATION FILED MAY 24, 1910.

1,005,480.

Patented Oct. 10, 1911.

INVENTOR.
OTTO SCHMID,

O. SCHMID.
FLAT WIRE NETTING MACHINE.
APPLICATION FILED MAY 24, 1910.
1,005,480.
Patented Oct. 10, 1911.
7 SHEETS—SHEET 5.
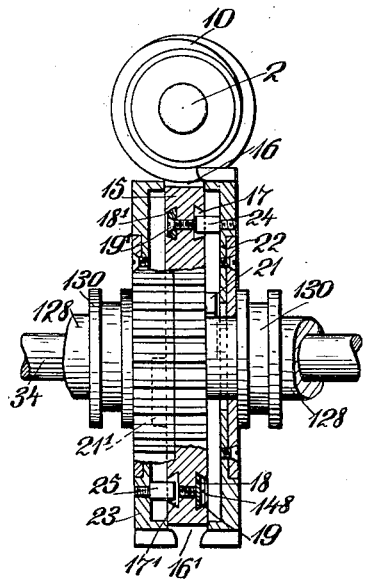
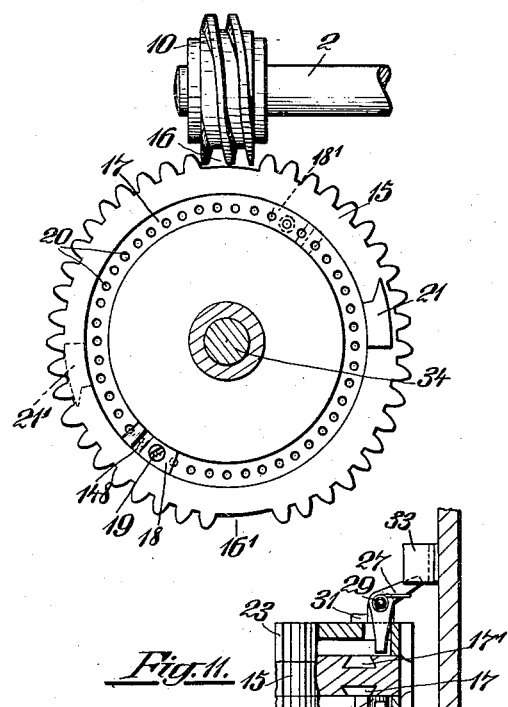
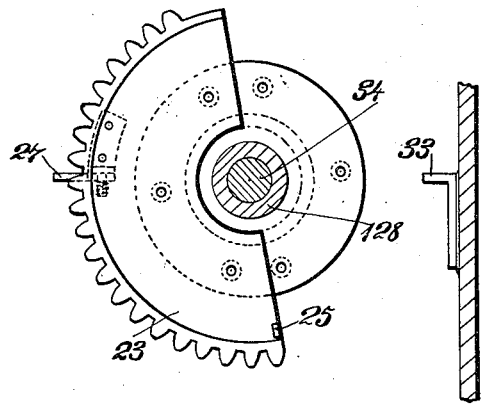
WITNESSES:
INVENTOR,
OTTO SCHMID,
by H van Oldenmael
Attorney.

O. SCHMID.
FLAT WIRE NETTING MACHINE.
APPLICATION FILED MAY 24, 1910.
1,005,480.
Patented Oct. 10, 1911.
7 SHEETS—SHEET 6.
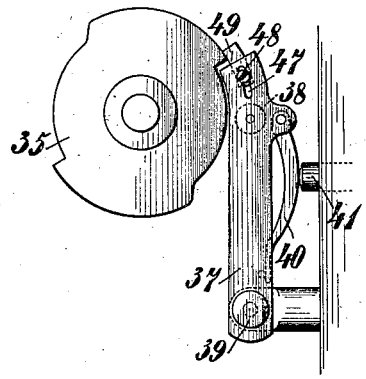
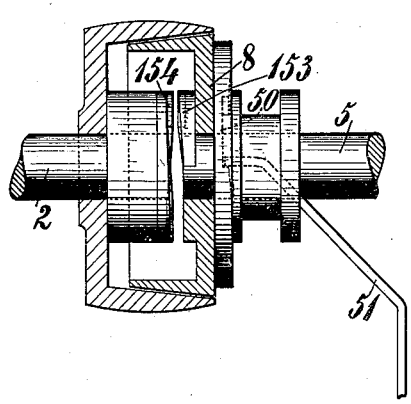
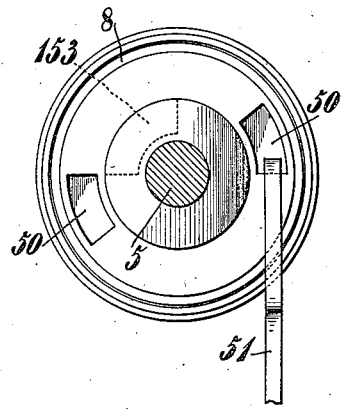
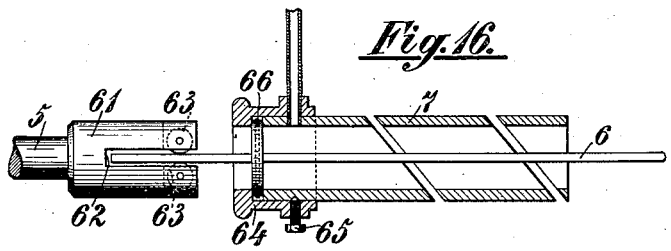
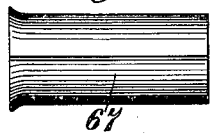
WITNESSES:
INVENTOR,
OTTO SCHMID,
by
Attorney.

O. SCHMID.
FLAT WIRE NETTING MACHINE.
APPLICATION FILED MAY 24, 1910.
1,005,480.
Patented Oct. 10, 1911.
7 SHEETS—SHEET 7.
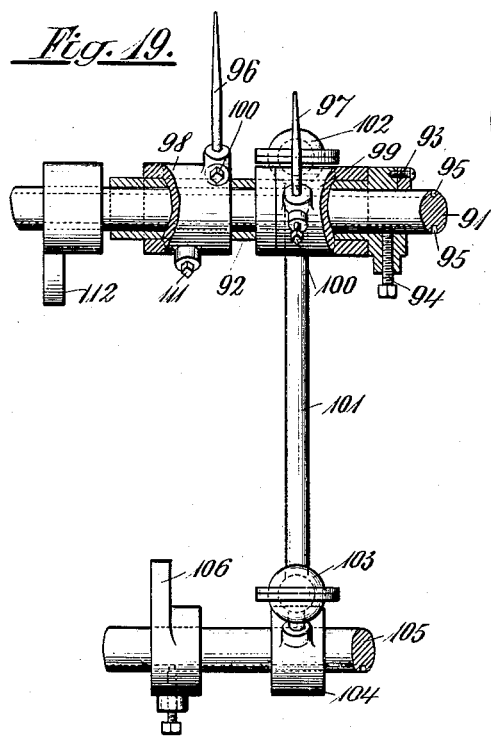
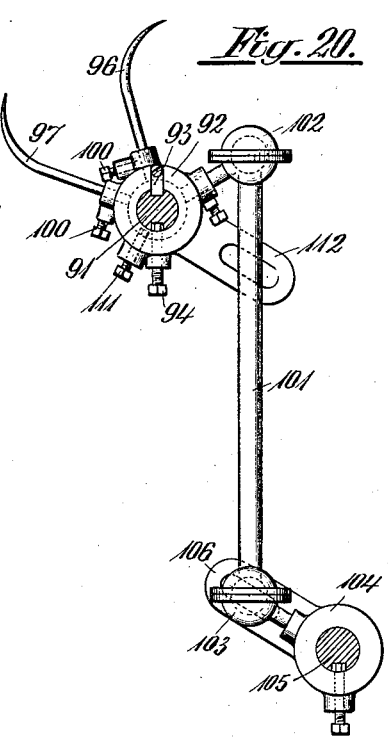
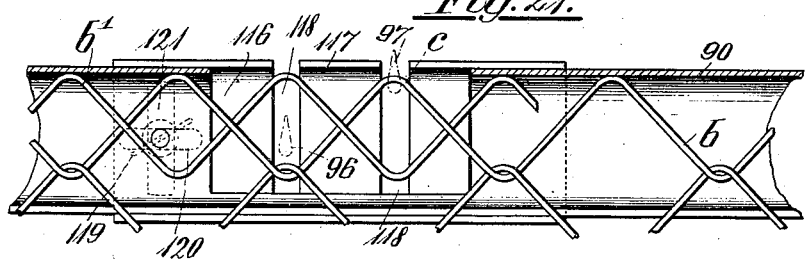
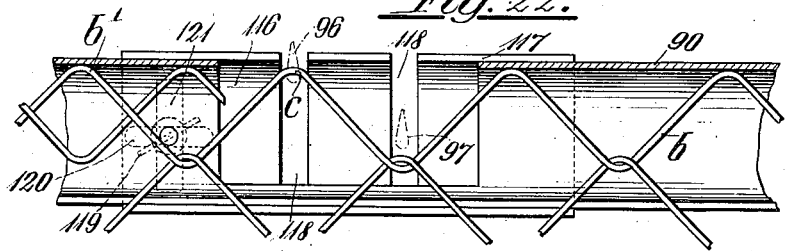
WITNESSES:
W. H. Berrigan
F. H. Logan
INVENTOR,
OTTO SCHMID,
by H. van Deldennel
Attorney.

UNITED STATES PATENT OFFICE.

OTTO SCHMID, OF FEUERBACH, GERMANY.

FLAT-WIRE-NETTING MACHINE.

1,005,480.  Specification of Letters Patent.  Patented Oct. 10, 1911.

Application filed May 24, 1910. Serial No. 563,103.

*To all whom it may concern:*

Be it known that I, OTTO SCHMID, a citizen of the German Empire, residing at Feuerbach, in the Kingdom of Wurttemberg, Empire of Germany, have invented certain new and useful Improvements in Flat-Wire-Netting Machines; and I do hereby declare the following to be a full, clear, and exact description of the invention, such as will enable others skilled in the art to which it appertains to make and use the same.

This invention has for its object a machine by means of which the ordinary flat wire netting with rectangular diagonally-lying meshes may be made substantially automatically. This netting was hitherto as a rule made by hand and the various steps, such as hooking in the network, cutting off, etc., performed after the shaping of the wire rod was usually done by hand, that is to say only the shaping of the wire rod and the screwing of the same into the last row of meshes of the finished network was carried out by machinery. As compared with this, this improved machine is characterized by its great capacity of production inasmuch as it works substantially automatically. The netting was also hitherto usually made in the actual width desired, it being unusual to proceed beyond a certain width, while with this new machine it is possible to make a network of two, three and more times the width, which may then be also automatically cut to the desired width, so that the expenditure of time necessary for hooking on the netting by cutting off each separate bar and so forth, is saved. Finally the improved machine according to this invention has the advantage that netting of any desired width and length and of any size of mesh, can be made thereon by merely adjusting certain parts.

Some forms of construction of the machine according to this invention are shown as an example in the accompanying drawings, in which:—

Figure 4:
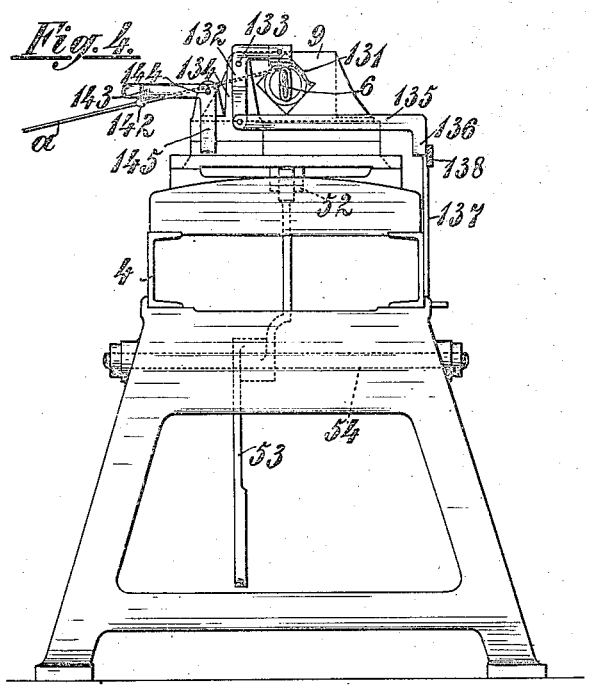
Figure 5:
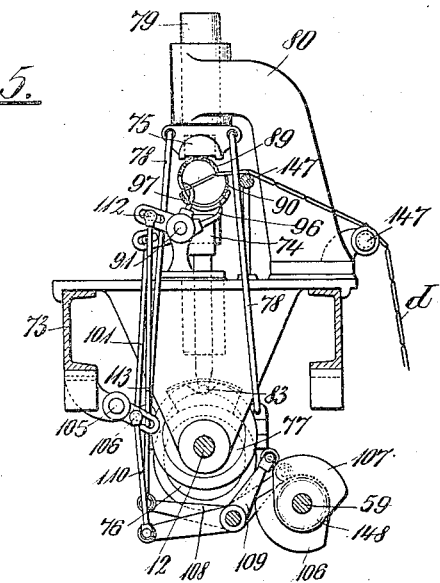
Figure 23:
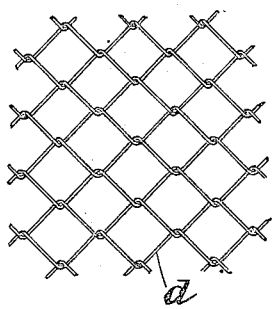
Figure 6:
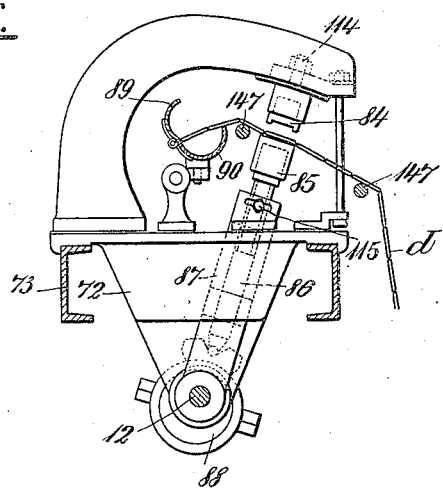

Figure 1 is a front view of the machine as a whole; Fig. 2, an end view of the same; Figs. 3 and 4 are lateral sections and show the means for driving the various shafts and a device for automatically throwing the machine out of action in the event of any interruption of the working; Fig. 5 is an end view of the hooking on device; Fig. 6 is an end view of the cutting device for cutting the network to the desired width; Figs. 7 to 11 are detail views of the so-called regulating or controlling mechanism; while Fig. 12 shows another form of construction of the same; Fig. 13 is an elevation of the device for alternately throwing into action the plaiting mechanism and the cutting mechanism; Fig. 14 is an axial section; and Fig. 15, an end view of a clutch or coupling device; Fig. 16 is an axial section of the plaiting worm and knife; while Figs. 17 and 18 are respectively a side view and cross section of a feed sleeve; Figs. 19 and 20 are respectively a front view and side view of the hooking on hooks; while Figs. 21 and 22 illustrate the formation of the netting, that is to say the insertion of a fresh wire rod and also the adjustability of the hooking on hooks. Fig. 23 shows a piece of wire netting illustrating the fabric produced by this machine.

A shaft 2 is first operated from the driving pulley 1, which shaft is mounted in a bracket 3 of the plaiting machine frame 4. This shaft 2 is coupled by means of a coupling or clutch device 8 with the shaft 5 of the ordinary plaiting knife 6, which turns in the plaiting worm 7. The plaiting worm 7 is mounted in an axially displaceable vise 9. The wire is fed to it as usual, then engaged by the knife 6 and by the rotation of the latter bent into a zigzag shaped wire rod $b$, which by means of a feed tube 67 is moved forward into a so-called spiral gripper 90 and thus screwed into the last row of meshes of the finished netting. When the bar or rod $b$ has the desired length, it is cut off by means of a cutting device and for this object a regulating device comes into action, which is operated from the shaft 2 by means of the worm 10. At a suitable moment the clutch 8 is released, whereby the plaiting mechanism becomes stationary, while a clutch 11 is thrown into action, which by means of suitable cam disks operates the cutting mechanisms. The clutch 11 is mounted on a shaft 12 and couples the latter with a toothed wheel 70 operated by toothed wheels 14 from the driving shaft 2, the wheel 70 being loosely mounted on the shaft 12. When the wire rod $b$ has been cut off, it is held fast by the hooks of a hooking on mechanism, so that the newly formed row of meshes is held in a correct position. The regulating mechanism now releases the clutch 11 and brings the clutch 8 into action, whereby the eccentrics of the cutting and hooking on mechanism pass out of action and, as the shaft 2 is now coupled with the shaft 5 of the knife, the knife 6 again twists a fresh rod $b'$, which is then wound into the last finished rod $b$. Now in order to obtain an exact entrance of the fresh rod $b'$ into the rod $b$, the vise 9 and plaiting worm and knife are displaced to half the diagonal of a mesh, whereby the fresh rod $b'$ is prevented encountered the rod $b$ and it receives the correct displaced position. If, however, the network is to be wider than before, that is to say if the separate spirals are to be longer, the uncoupling of the clutch 8 of the plaiting knife axis 5 must only take place later, whereby the plaiting knife 6 works for a correspondingly longer time, and thus the rod is longer. The period of operation of the cutting device and the hooking in device is, however, always the same, while the duration of the plaiting must be longer. Now in order to be able to prolong or shorten at any time the period of the uncoupling, the regulating device hereinbefore mentioned is provided, which automatically regulates the coupling and uncoupling according to the desired length of rod. This regulating device consists of a toothed wheel 15, which is mounted on a shaft 34 and has at two opposite places toothless intervals 16 and 16'. The toothed wheel 15 has grooves 17 and 17' in both faces, in which two stops 18 and 18' which are adjustable according to the number of meshes, are arranged. For adjusting the stops 18 set-screws 19 and setting holes 20 are provided in the grooves 17 and also releasing cams 21 and 21' are fixed on opposite sides of the toothed wheel 15. Toothed segments 22 and 23 which have pins 24 and 25 which travel in the grooves 17 and 17' of the toothed wheels 15 (Fig. 7) are also located on opposite sides of the toothed wheel 15 and are loosely revoluble on the axis 34. Each of the toothed segments 22 and 23 has on its outside an elbow lever 26 or 27 (Fig. 11), which is under the action of a spring 28 or 29 respectively, and is mounted on an elbow piece 30 or 31 of the toothed segments 22 and 23. One end of the elbow levers 26 and 27 passes through its respective toothed segment 22 and 23, while the other ends bear against a fixed contact piece or stop 32 or 33 on the machine frame, and thereby prevent the segments 22 and 23 rotating. These toothed segments 22 and 23 may be suitably prolonged by the addition of larger or smaller toothed arcs, in order to make wire netting having a larger number of meshes. In order to further transmit the movement obtained, cam disks 35, 36, are mounted to right and left respectively on the shaft 34, one of which cam disks 35 serves for throwing into and out of action the clutch 8 i. e. for shaping the wire rods, while the other eccentric 36 controls the clutch 11, and thus effects the cutting off, etc. The toothed segments 22 and 23 are on the other hand each mounted on a sleeve 128 and may be brought out of contact with the worm 10 by means of lever 129 which is under the action of a spring 13 and which engages in the ring 130, that is to say, thrown out of and into gear, in order to effect a certain adjustment. Now if the toothed wheel 15 be rotated, the cam disks 35 and 36 also rotate and alternately throw into and out of action the clutches 8 and 11. A rod is thus twisted after the clutch 8 has been thrown into action by means of the eccentric 35 and this rod is then cut off, after the clutch 11 has been thrown into action by means of the eccentric 36, while the first clutch 8 is thrown out of action.

The action of the regulating device will now be described and first the operation of the clutch 8, that is to say the shaping of a wire rod will be explained.

The shaft 2 and worm 10 rotate continuously and the latter turns the wheel 15, until the interval 16 occurs, whereupon the toothed wheel 15 becomes stationary. Shortly before this takes place, the releasing cam 21 of the toothed wheel 15 engages beneath the end, which projects through the toothed segment 22, of the elbow lever 26, and, in consequence of the beveling of the cam 21, the elbow lever 26 is turned, whereby its other end is released from the stop 32. The releasing cam 21 by means of the elbow lever 26 then carries the toothed segment 22 with it and at the same moment at which the interval 16 reaches the worm 10, this gears with the segment 22. The toothed wheel 15 therefore remains stationary and the segment 22 is turned, while the pin 24 finally encounters the displaceable stop 18. The pin 24 then runs up the inclined face of the stop 18 and passes into its recess 148, whereby it is carried along, that is to say the toothed wheel 15 is rotated further. In order to enable the pin 24 to run up the inclined surface of the stop 18, the segment 22 is subjected to the action of a spring 13, which influences the hand lever 129 and ring 130 on the sleeve 128 on which the segment 22 is mounted, whereby the same can be somewhat laterally displaced. The toothless interval 16 passes the worm 10 and then this again engages the toothed wheel 15 and turns the same. The toothed segment 22 after its teeth have run off, then comes out of action, it being carried along until its elbow lever 26 encounters the stop 32 and then remains at rest. In this way the toothed wheel 15 is again in engagement with the worm 10 until the other toothless interval 16' occurs. Then in order to again bring the toothed wheel 15 into engagement with the worm 10, a second toothed segment 23 is provided on the other side, which works exactly like the toothed segment 22 on the right. Here the releasing cam 21' shortly before the second toothless interval 16' comes along engages beneath the elbow lever 27 and the latter is pushed back, whereby its other end is released from the contact 33. The releasing cam 21' then again carries with it by means of the elbow lever 27, the toothed segment 23, and on encountering the interval 16' of the toothed wheel 15, the worm 10 gears with the toothed segment 23. The toothed wheel 15 remains stationary and the segment 23 is turned. The segment 23 is turned by the worm 10, the pin 25 of the segment 23 encountering a stop 18' and taking the same with it, that is to say the toothed wheel 15 is again turned; the toothless interval 16' passes the worm 10 and the latter engages the toothed wheel 15, whereupon the operation is repeated. Now as long as the toothed wheel 15 rotates, the cam 35 also rotates. This controls a lever 37, the roller 38 of which travels on the cam disk, while the end of the lever 37 turns on a pin 39. Now when the roller 38 mounts the cam of the cam disk 35, the lever 37, by the action of the spring 40, presses the bar 41 forward and the lever 42 throws the clutch 8, out of action, that is to say the knife comes out of action and a rod $b$ is formed (Figs. 1 and 13). During this operation the clutch 11 of the cutting device, etc., is thrown out of action and for this purpose the roller of the lever 43 which pivots on the pin 44 rests on the cam of the cam disk 36, and thus the rod 45 and lever 46 are out of action, that is to say the clutch 11 is released when the clutch 8 is in action. As soon, however, as the clutch 8 is out of action the clutch 11 must be thrown into action and this is done by the roller of the lever 43 passing onto the recessed part of the cam disk 36, whereby the lever 43, rod 45 and lever 46 move back, while the clutch 11 is thrown into action and the hooking in and cutting off take place. Now if rods $b$ of a different length are to be formed it is only necessary to displace the stops 18 and 18' of the toothed wheel 15, which may be done by means of the set screws 19, so that the arms 24 and 25, for instance, encounter the stops 18 and 18' respectively later, and thus the stationary toothed wheel 15 is in turn set in rotation later, that is to say the toothed wheel 15 remains stationary longer and thus also the cam disks 35 and 36, and so the clutch 8 remains longer in action and a longer rod $b$ is thus wound. Now as the vise as was already mentioned and thus also the plaiting knife 6 is axially displaced in making a fresh rod, in order to obtain a secure winding in of the rod, the new rod would be too short if the stops 19 and 19' were adjusted to the same number of teeth of the segments 22 and 23. In order to avoid this, one tooth more must be adjusted by the stop 19' than by the stop 19.

The construction of the regulating device may also be different, thus, for instance, the same action might also be obtained by means of a ratchet wheel and pawl or by a worm 122 and toothed wheel 123 (Fig. 12). Here the worm is again mounted on the shaft 2 and the toothed wheel 123 on the shaft 34. The wheel is divided into four toothed sections. The parts 124 and 125 always have an equal number of teeth and serve for controlling the hooking in and cutting off mechanism, while the removably arranged tooth segments 126 and 127 are provided with more or less teeth according to the number of meshes of the length of rod to be made. The toothed segment 127 must have one more tooth, that is to say it must wind one more mesh by reason of the displacement of the vise 9. If therefore with this form of construction another length of rod is to be made, the segments 126 and 127 are exchanged for others which have a suitable number of teeth. The stops 18, 18', of the toothed wheel 15 can only be adjusted to full teeth, that is to say always to an entire mesh more or less, and a device is provided which allows of the adjustment to half meshes. For this object the head of the lever 37 is provided with a slot 47 (Fig. 13), through which a set screw 48 passes which grips a prolongation 49. The result is thereby attained that according to the adjustment of the prolongation 49, the lever 37 is thrown out of and into action later to the amount of time necessary for forming a half mesh. The contact surfaces of the cam disk 35 may equally well be suitably prolonged or extended.

The coupling 8 consists of a positive clutch coupling and a friction coupling. The latter comes into action shortly before the clutch portion 154 of the former comes into operation, so that it works without shock. As the plaiting knife must always again assume quite exactly its initial position in threading a fresh rod $b'$ into the finished meshes, the coupling 8 is provided with recesses 50, in which when throwing out the clutch 8, a spring arm 51 enters and its hooked end releases the clutch under all circumstances, exactly in the correct position, and retains it at the appointed time. The spring arm 51 during the rotation of the coupling 8 slips on the surface of the movable part, and prevents the latter prematurely releasing the coupling. The spring 40 is also stretched, so that the uncoupling takes place suddenly when the arm 51 enters one of the recesses 50, whereby the knife 6 is immediately stopped in the correct position. Now in order to prevent, when uncoupling the coupling 8, the spring arm 51 striking the projection of the recess 50 too hard in consequence of the great speed of the shaft 5, a band brake is provided which comes into action at a suitable moment. For this purpose an elbow lever 149 is provided on the bearing bracket of the shaft 5, which lever is connected with the brake band 151 of the band brake by a rod 150. The lever 42 also has a pin 152, which when the coupling 8 is thrown out of action is moved sidewise by the lever 42, so that it encounters the elbow lever 149 and by means of the rod 150 draws on the brake band 151, whereby the desired braking takes place. Further in order to prevent the front end of the new rod $b'$ encountering the finished wound rod $b$, the vise 9 with the weaving knife 6 and spiral tube 7 is arranged so as to be displaceable to a part of a mesh. For this object the forked end 52 of a lever 53 engages a projection of the vise 9. At the lower end of the lever 53, which rocks on a pin 54, a drawbar 55 is linked, which by means of a lever 56 and a compulsory guide or cam 57 is pushed to and fro and thereby also displaces the vise 9. The lower end of the lever 56 is provided with a slot 58 in which the end of the drawbar 55, corresponding to the desired movement of the vise 9, may be adjusted. The cam 57 is mounted on a shaft 59, which is connected with the shaft 12 by means of toothed wheels 60.

In order to hold the plaiting knife 6 always in connection with the shaft 5 when the vise 9 and plaiting spiral 7 are adjusted, the end of the shaft 5 is formed as a head 61 which has a slot 62 in which the plaiting knife 6 may be axially adjusted, while for the better guidance in the head 61, guide rollers 63 are also provided. On the plaiting spiral 7 a head 64 is fixed by means of a screw 65, and between the plaiting spiral 7 and the head 61, a ring 66 of the plaiting knife 6 lies, the spiral 7 and head 61 then serving for guiding the ring 66 (Fig. 16).

The clutch 11 which couples the shaft 12 of the cutting device with the toothed wheel 70 operated by the shaft 5 and toothed wheels 14, must also come into action at a given time. For this object the clutch 11 is provided with a single cam 68, while the toothed wheel 70 is provided opposite this cam with a number of cams 69. Now when the bar 45 and the lever 46 are coupled by means of the cam disk 36, the cam 68 of the clutch 11, immediately engages the nearest cam 69 of the constantly rotating toothed wheel 70, whereby the shaft 12 is immediately rotated, that is to say the cutting devices, etc., are operated. The finished wound rod is then fed to a plaiting tube, and a feed tube 67 formed in two parts and adapted to fold back is provided for securely inserting the bar in the weaving tube, which feed tube catches the bar and feeds it to the plaiting tube.

The rod is cut off by the jaws 74 and 75 in the following way:—When the rod is of the desired length the clutch 8 is automatically thrown out of action and the clutch 11 thrown into action. Its shaft 12 is mounted in bearings 71 and 72 of the machine frame 73, two eccentrics 76 and 77 are provided on the shaft 12 for controlling the cutting jaws 74 and 75. The cutting jaw 75 is also lowered by the action of the eccentric 77, which draws downward the cutting jaw 75 by means of rods 78, a pin 79 of the cutting jaw 75 sliding in guides of the bearing 80, while the lower cutting jaw 74 is carried by a bar 81, which slides in a guide 82 of the bearing 71. The jaws thus merely make an up and down movement, the rods being cut obliquely to the longitudinal direction of the network in this direction, so that sharp points are formed at the projecting ends of the rods. Now the lower end of this bar 81 rests in a recess 83 of the eccentric 76 and when the latter rotates the bar 81 is lifted, whereby the cutting jaw 74 is raised.

In this improved machine wire netting of any suitable width may be made, which is then cut to the desired width. For this object a further cutting device is provided. This is carried by the bearing bracket 72 which is displaceably mounted in the frame 73 of the plaiting machine and consists of a pair of cutting jaws 84 and 85. The upper cutter 84 is fixed, while the lower cutter 85 is carried by a bar 86 which slides in a guide 87 of the bearing bracket 72 and is lifted by an eccentric 88. The cutting jaws 84 and 85 may, however, be suitably laterally adjusted by means of set screws 114 and 115 to the actual width of the meshes.

The plaiting tube substantially consists of an upper part, viz., a guide cover 89 which serves for securely guiding the rod, and a lower part, the so-called spiral catcher 90. While the width of the guide cover 89 must exactly correspond to the diameter of the rod, the diameter of the spiral catcher 90 is larger, in order to provide a secure entrance for the end of the rod to be wound. Now as when a new rod $b'$ is wound in, the last rod $b$ is lying in the spiral catcher 90 and must be retained in a correct position, a so-called hooking in device is provided for this object. For this purpose a number of bushes 92 are displaceably mounted on a shaft 91, which bushes for instance are guided by means of wedges 93 and screws 94 in grooves 95 of the shaft 91. Two hooks 96 and 97 are also mounted on each of the bushes 92, which hooks are carried by holders 98 and 99. These hooks 96 and 97 are removable and may be fixed by screws 100. The hook holder 99 is mounted so as to be loosely revoluble but not displaceable on the bush 92, and is connected with the shaft 105 by means of a rod 101 and ball joints 102 and 103. The ball joint 103 is connected with a set ring 104, which is mounted on the shaft 105, so as to be axially displaceable. When the shaft 105 is rotated, the rod 101 is raised and lowered and with it the hooks 97.

The shaft 105 is oscillated in the following way:—Two cam disks 106 and 107, which operate two elbow levers 108 and 109 are mounted on the shaft 59. The cam disk 107 operates the elbow lever 109 which is connected with a rod 110, which is in turn connected with an eye in the cam disk 106 mounted on the shaft 105. When the eccentric 107 turns, the shaft 105 oscillates, whereby the hook 97 rises and falls by means of the rod 101. The hook holder 98 on the other hand is secured on the bush 92 by means of a set screw 111, which travels in a groove of the bush 92 and is laterally displaceable. While the holder 99 and hook 97 may rise and fall without the bush 92 making any movement, the holder 98 and hook 96 can only rise and fall when the bush 92 turns, that is to say when the shaft 91 is moved. For this object an eyelet 112, which is connected by means of a rod 113 with the elbow lever 108, which is operated by the cam disk 106, is provided on the shaft 91, and thereby the shaft 91 has a tilting movement imparted to it, so that the hook 96 rises and falls. These hooks 96 and 97 work alternately, namely all the hooks 97 engage the bending places $c$ of the rod $b$, which is in the spiral catcher 90, while the other hooks 96 are lowered. The hooks 96 then rise, while the hooks 97 descend and the finished network is wound up on an independently working winding up device of any suitable kind. Now as the hooks 96 and 97 move in the spiral catcher 90 and must be able to be displaced laterally, the catcher is provided with a slot 116, and a protective plate 117, which closes the slot 116, is provided in order to nevertheless securely guide the rod $b'$, and this plate 117 has two slots 118 in which the hooks 96 and 97 may move. The protecting or cover plate 117 is displaceable, for instance by means of a set screw 119 and slot 120, and is pressed firmly against the spiral catcher 90 by means of a spring 121. Provision is also made for immediately stopping the machine should a wire $a$ (Fig. 4) break or jam during the plaiting. For this purpose an independent device for throwing the machine out of action is provided. This consists of a hood 131 arranged over the plaiting knife 6 and connected with an elbow lever 132 which turns on a pin 133 of the bearing 134. Now if the wire $a$ jams at any place, the hood 131 is raised and thereby the lever 132 pushes an arm 135 forward, the front end 136 of which rests on a bar 137. This causes the lever 138 which throws the machine out of action, and which also rests on the bar 137, to be pushed off its support by the end 136 of the arm 135, whereby the lever 138 drops down and automatically releases the coupling 141 by means of the arm 139 and lever 140, whereby the machine is brought to a standstill. In order, however, also on the breakage of a wire $a$ to cause an immediate stoppage of the machine, the wire $a$ runs through an eyelet 142 of an elbow lever 143, which turns on a pin 144 on the bearing 134 and is kept by the wire $a$ in a horizontal position. Now if the wire $a$ breaks, the elbow lever 143 loses its hold and descends, whereby the arm 145 of the lever 143 bears against the arm 135 and pushes it forward, so that the machine is thrown out of action in the same way as hereinbefore described. There is also a hand lever 146 provided for throwing the machine out of action, by means of which the coupling 141 may be thrown into and out of action at will.

Now the working of the machine is as follows:—When the stops 19 and 19′ are suitably adjusted on the toothed wheel 15 to the desired length of the wire rod the link 55 by the displacement of its end in the slot 58 is given the necessary projection for the adjustment of the vise 9 and also the pair of shears 84 and 85 adapted to the width of the mesh and the end of the wire $a$ wound around the plaiting knife 6, the toothed segments 22 and 23 are thrown into engagement by means of the hand lever 129, whereupon the machine is set in operation. The couplings 141 and 18 are also thrown into gear, that is to say the plaiting knife 6 operates, while the clutch 11 is thrown out of action, whereby the pairs of cutting jaws 74 and 75 and 84 and 85 as well as the hooking on hooks 96 and 97 are in a position of repose. The worm 10 then turns the toothed wheel 15 and thus the cam disks 35 and 36 operate the throwing into and out of engagement of the clutches 8 and 11. The roller 36 of the lever 37 then travels on the deeper recessed part of the cam disk 35, whereby the clutch 8 remains closed, while the roller 38 of the lever 43 travels over the cam on the cam disk 36, whereby the coupling 11 is thrown out of action. Now, however, the interval 16 of the toothed wheel 15 intervenes and the latter remains stationary and consequently also the cam disks 35 and 36 do the same, that is to say the plaiting knife no longer operates and the rod is conveyed by the guide tube 67 to the spiral gripper 90 and also pushed forward therein. As the worm wheel is stationary, however, the segments 22 and 23 turn alternately and after a given time take the toothed wheel 15 again along with them. The cam disks 35 and 36 rotate causing a change of the surface on which the rollers travel, in such a way that the roller 38 of the cam disk 35 now travels on the cam but the clutch 8 is thrown out of action, that is to say the plaiting knife 6 is stationary, the arm 51 holding the clutch 8 in the correct position, while the roller 38 of the lever 43 travels over the recessed part of the cam disk 36, that is to say the clutch 11 is thrown into action. When a rod $b$ is thus wound, the change of clutch takes place, whereby only the shafts 12 and 59 rotate. The cam disks 106 and 107 and the elbow levers and rods belonging thereto, consequently cause the hooking in hooks 96 and 97 to operate, that is to say a hooking in takes place. In the meantime the eccentrics 76, 77 and 88 have approached the pairs of cutting jaws 74, 75 and 84, 85 to one another, so that immediately after the hooking in, the cutting off takes place and the network is simultaneously cut, whereupon the vise 9 is displaced by means of the guide or cam 57, link 55 and lever 53 to half the diagonal of a mesh. In the meantime the cam disks 35, 36, have been turned, so far that the cam disk 35 has again thrown the coupling 8 into action, while the cam disk 36 has thrown the coupling 11 out of action, that is to say the plaiting knife winds a fresh rod $b'$, which is screwed into the previous bar, which is held in the spiral gripper 90 and retained by one row of hooks 96 or 97, whereupon the operation is again repeated. Instead of displacing the vise, the mesh catcher and hooking in hooks and middle cutting device may also be displaced to and fro. The wire netting $d$ made in this manner travels over bars 147 (Fig. 5) and is wound up by a suitable self-regulating winding up device, which, for instance, is operated from the toothed wheel 148, which is mounted on the shaft 59.

I declare that what I claim is:—

1. In a machine for automatically making wire netting, the combination of a drive shaft; operating means for operating upon the wires forming the netting; a clutch-device between said shaft and means, for throwing the operating means in or out of gear with the drive shaft; a toothed wheel having a toothless interval; a driving element operatively connected with the drive shaft and adapted to engage the teeth of the toothed wheel; means associated with the toothed wheel and adapted to engage the driving element and the toothed wheel to cause the toothless interval to move past the driving element so that the teeth of the wheel may be again engaged; a cam-disk rotated by the toothed wheel; and an operative connection between the cam disk and the clutch device.

2. In a machine for automatically making wire netting, the combination of a drive shaft; operating means for operating upon the wires forming the netting; a clutch device between said shaft and means, for throwing the operating means in or out of gear with the drive shaft; a worm operatively connected with the drive shaft; a toothed wheel engaging said drive shaft and having a toothless interval; an adjustable stop on said wheel; a releasing cam on said wheel; a toothed segment adapted to revolve with said wheel and relative thereto; a contact stop; a lever pivoted on the segment adapted to be engaged by the same and to engage the contact stop; a projection on the segment and adapted to engage the adjustable stop; a cam-disk operatively connected to the toothed wheel, and in operative connection between the cam-disk and the clutch device.

3. In a machine for automatically making wire netting, the combination of a drive shaft; operating means for operating upon the wires forming the netting; a clutch device between said shaft and means, for throwing the operating means in or out of gear with the drive shaft; a worm driven by the drive shaft; a toothed-wheel adapted to engage said worm and provided with a toothless interval, and with an annular groove in its side face; an adjustable stop in said groove; a releasing cam on said face; a shaft for said toothed wheel; a toothed segment on said shaft and adapted also to engage said worm; a lever fulcrumed on the segment and adapted to be engaged and moved by said cam, a fixed contact stop adapted to be engaged by said lever and to hold the segment against rotation when so engaged and from which said lever is released when engaged by the same; a cam disk mounted on the shaft of the toothed wheel; and an operative connection between the same and said clutch device.

4. In a machine for making wire netting, the combination of a drive shaft; a means for twisting the wire; a means for cutting off and hooking-in the wire; a pair of clutch devices one for each of said means, for throwing the means in or out of gear with the drive shaft; a worm operatively connected with the drive shaft; a toothed wheel engaging said worm and provided with toothless intervals; a shaft for the toothed wheel; toothed segments associated with the toothed wheel and adapted to engage the worm and move the toothed wheel past the toothless intervals; a pair of cams on the shaft of the toothed wheel; and a pair of operative connections, one for each cam, for operating said clutch devices respectively by the movement of the cams.

5. In a machine for automatically making wire netting, the combination of a drive shaft; operating means for operating upon the wires forming the netting; a clutch device between said shaft and means, for throwing the operating means in or out of gear with the drive shaft; a worm operatively connected with the drive shaft; a toothed wheel engaging said drive shaft and having a toothless interval; an adjustable stop on said wheel; a releasing cam on said wheel; a toothed segment adapted to revolve with said wheel and relative thereto; a contact stop; a lever pivoted on the segment adapted to be engaged by the same and to engage the contact stop; a projection on the segment and adapted to engage the adjustable stop; a cam disk operatively connected to the toothed wheel; a movable member; a prolongation piece adjustably connected to the movable member and adapted to engage the cam-disk; and an operative connection between said movable member and the clutch device.

6. In a machine for automatically making wire netting, the combination of a drive shaft; a knife shaft operatively connected thereto and having a longitudinal slot in the end thereof; a plaiting knife longitudinally displaceable in said slot; and guide rollers interposed between said knife and the sides of the slot.

7. In a machine for automatically making wire netting, the combination of a knife shaft; a plaiting knife adapted to be rotated by the knife shaft and longitudinally displaceable relative thereto; a vise also longitudinally displaceable, and a plaiting spiral carried by the vise and receiving the knife.

8. In a machine for automatically making wire netting, the combination of a knife shaft; a plaiting knife rotated thereby and axially displaceable relative thereto; a ring secured to the knife and clasped in a plane transverse thereto; an axially displaceable vise; and a plaiting spiral in said vise and receiving said knife and provided with an annular groove receiving said ring.

9. In a machine for automatically making wire netting, the combination of a rotatable plaiting knife; a plaiting spiral coaxial therewith; a fixed sleeve in alinement with the plaiting spiral and adjacent thereto, and a foldable guide tube in alinement with the fixed sleeve and adapted to guide a spiral wire into the netting.

10. In a machine for automatically making wire netting, the combination of a rotatable plaiting knife; a plaiting spiral coaxial therewith; a fixed sleeve in alinement with the plaiting spiral and adjacent thereto, a guide tube in alinement with the fixed tube and adapted to receive the spiral wire from the plaiting knife; and means for holding one spiral wire in the tube while the next succeeding wire is being twisted in place.

11. In a machine for automatically making wire netting, the combination of a rotatable plaiting knife; a plaiting spiral coaxial therewith; a fixed sleeve in alinement with the plaiting spiral and adjacent thereto, and a slotted guide tube in alinement with the fixed tube and adapted to receive spiral wires therefrom; and two rows of alternating movable hooks projecting in through said slots and adapted to be independently displaced for successively engaging the wires of the netting while the next wire is being twisted in.

12. In a machine for automatically making wire netting, the combination of a rotatable plaiting knife; a plaiting spiral coaxial therewith; a fixed sleeve in alinement with the plaiting spiral and adjacent thereto, and a slotted guide tube in alinement with the fixed tube and adapted to receive spiral wires therefrom; two rows of alternating movable hooks projecting in through said slots and adapted to be independently displaced for successively engaging the wires of the netting while the next wire is being twisted in, and laterally displaceable covers for the slots of the guide tube.

13. In a machine for automatically making wire netting, the combination of means for holding the part of the netting already formed; a plaiting knife for twisting the wires; means for guiding the twisted wires to the last wire formed into the netting for hooking said twisted wire into the last formed wire; jaws for cutting off the proper length of the twisted wire; and automatic means for operating said jaws at the correct time.

14. In a machine for automatically making wire netting, the combination of means for holding the part of the netting already formed; a plaiting knife for twisting the wires; means for guiding the twisted wires to the last wire formed into the netting for hooking said twisted wire into the last-formed wire; jaws for cutting off the proper length of the twisted wire; and automatic means for operating said jaws at the correct time, said jaws being disposed obliquely to the wire at the point at which it is cut, whereby a sharp point is produced on the end of the wire.

15. In a machine for automatically making wire netting, a drive shaft; a knife shaft; clutch members secured to said shafts respectively and movable toward and away from each other and provided with coöperating friction surfaces and coöperating position clutch surfaces, one of said members being provided with recesses; and a spring arm adapted to engage in said recesses.

16. In a machine for automatically making wire-netting, a drive shaft; a knife shaft; clutch members secured to said shafts respectively and movable toward and away from each other and provided with coöperating friction surfaces and coöperating position clutch surfaces, one of said members being provided with recesses; a spring arm adapted to engage in said recesses, and an independent brake for stopping the knife without shock.

17. In a machine for making wire netting, the combination of a drive shaft; a knife shaft; a clutch device operatively connecting the knife shaft with the drive shaft; a plaiting knife carried by the knife shaft; means for holding the already formed netting while a new wire is being twisted in; a cut-off device for cutting off the twisted-in wires at the proper time; a clutch-device operatively connecting the cut-off device with the drive shaft; and means operated by the rotation of the drive shaft for automatically operating both of said clutch devices at the proper time.

18. In a machine for making wire netting, the combination of a drive shaft; a knife shaft; a clutch device operatively connecting the knife shaft with the drive shaft; a plaiting knife carried by the knife shaft; means for holding the already formed netting while a new wire is being twisted in; a cut-off device for cutting off the twisted-in wires at the proper time; a clutch device operatively connecting the cut-off device with the drive shaft; and means operated by the rotation of the drive shaft for automatically operating both of said clutch devices at the proper time, the clutch device between the drive shaft and the knife shaft comprising a pair of clutch members secured to said shafts respectively and movable toward or away from each other and provided with coöperating friction surfaces and coöperating position clutch surfaces, the one of said members being secured to the knife-shaft being provided with recesses; and a spring arm adapted to engage in said recesses and to stop and permit the starting of the knife shaft at exactly the right position.

19. In a machine for making wire netting, the combination of a drive shaft; a plaiting knife; a clutch device operatively connecting said knife and shaft; means for guiding the wire from the plaiting knife to the netting already formed; means for cutting the wire after it has been twisted into the netting; a hooking-in means for holding the wire when cut; a second shaft; a second clutch device operatively connecting the second shaft with the drive shaft; means for automatically throwing said clutch devices in and out of gear; cams on said second shaft; means operatively connecting certain of said cams with the means for cutting the wire; and means for connecting certain other of the cams with the hooking-in means, said cams being so disposed relatively to each other that the hooking-in means grasps the wire as soon as cut.

20. In a machine for making wire netting, the combination of a rotating plaiting knife; a driving means for the knife; a coupling between the driving means and the knife; a means for guiding a wire to the knife; a hood disposed over the wire and adapted to be raised by the wire when the wire jams; and an operative connection between the hood and the coupling means for uncoupling the coupling means when the hood is raised.

21. In a machine for making wire netting, the combination of a rotating plaiting knife; a driving means for the knife; a coupling between the driving means and the knife; a means for guiding a wire to the knife; a lever having an eye through which the wire is passed before it enters said guiding means, said lever being held in normal position by the wire and being adapted to move from normal position when not held by the wire; and an operative connection between the lever and the coupling for uncoupling the coupling when the lever moves from normal position.

In testimony whereof I affix my signature, in presence of two witnesses.

OTTO SCHMID.

Witnesses:
HERMANN WIETHÜCHTER,
FRANZ GAUPPY.